United States Patent [19]
Ban et al.

[11] Patent Number: 4,648,710
[45] Date of Patent: Mar. 10, 1987

[54] BLIND GUIDE DEVICE

[76] Inventors: Itsuki Ban, 3-50-18 Higashi Oizumi, Nerima-ku; Toshiyuki Kii, 2-9-12 Nakane, Meguro-ku; Yuji Mitsuta, 4-28-17 Shimo-Shakuji, Nerima-Ku, all of Tokyo, Japan

[21] Appl. No.: 728,932

[22] Filed: Apr. 30, 1985

[30] Foreign Application Priority Data

Jun. 13, 1984 [JP] Japan ............................. 59-86676[U]

[51] Int. Cl.⁴ ................................................ G01C 3/08
[52] U.S. Cl. ............................... 356/4; 135/DIG. 11; 340/600; 340/870.29
[58] Field of Search ........................ 356/4; 343/5 BL; 135/DIG. 11; 358/94; 901/47; 340/600, 870.29

[56] References Cited

U.S. PATENT DOCUMENTS 3,546,467 12/1970 Benjamin, Jr. et al. ..... 135/DIG. 11
3,661,459 5/1972 Aoki ......................................... 356/4

Primary Examiner—L. T. Hix
Assistant Examiner—David M. Gray
Attorney, Agent, or Firm—Pahl, Lorusso & Loud

[57] ABSTRACT

Blind guide device is disclosed. The device comprises a light-emitting element, a first electric circuit for generating an electric pulse and causing pulsating-conduction of the light-emitting element, a first lens for converging the light emitted from the light-emitting element onto a body to be detected, a mark attached to the body to be detected for performing retroreflection action, a second lens and a photo-detector element for receiving the light reflected by the body to be detected and the mark, a second electric circuit for amplifying the output electric signal of the photo-detector element and holding an electric signal synchronized with the electric pulse, a third electric circuit for generating an electric signal whose frequency or amplitude varies in response to the output electric signal of the second electric circuit, and an electro-acoustic transducer or vibrator for converting the output electric signal of the third electric circuit into a sound or into a stimulation.

6 Claims, 19 Drawing Figures

BLIND GUIDE DEVICE

BACKGROUND OF THE INVENTION

This invention relates to a photoelectric guide device for the blind.

Hitherto, with a view to assisting walking of the blind, some devices have been known which convert the distance information given from a distance measuring equipment utilizing ultrasonic wave or light into a stimulation in the form of sound or vibration thereby causing the blind to perceive the presence of an obstacle. Such devices are effective in avoiding an obstacle or danger during the walking. On the other hand, for the purpose of guiding and conducting the blind, the braille block or handrail is also known. However, by these means no one can appreciate a specified place or location. For instance, no one can find a push button-installed spot in a pedestrian crossing where a loudspeaker for guiding the blind is installed, and discriminate an entrance for man/woman in a toilet room, a gateway in a ticket gate, etc. from others.

SUMMARY OF THE INVENTION

The above-described drawbacks in the prior art devices have been successfully eliminated by the present invention.

It is an object of the present invention to provide a blind guide device which is helpful remarkably in living and walking of the blind.

It is another object of the present invention to provide a means available for living and walking by the use of which the blind can perceive a mark attached to a specified place or location as a sign, at a spot remote about ten meters from the mark through detection thereof by means of a photoelectric device.

In order to achieve the foregoing objects, a blind guide device according to the present invention comprises a light-emitting element, a first electric circuit for generating an electric pulse and causing pulsating-conduction of the light-emitting element, a first lens for converging the light emitted from the light-emitting element onto a body to be detected, a mark attached to the body to be detected for performing retroreflection action, a second lens and a photo-detector element for receiving the light reflected by the body to be detected and the mark, a second electric circuit for amplifying the output electric signal of the photo-detector element and holding an electric signal synchronized with the electric pulse, a V/F converter circuit or oscillator circuit for generating an electric signal of audible frequency whose frequency or amplitude varies in response to the output electric signal of the second electric circuit, and an electro-acoustic transducer or vibrator for converting the output electric signal of the oscillator circuit or converter circuit into a sound or into a stimulation.

These and other objects of the present invention will become apparent from the following description of embodiments thereof when taken together with the drawings.

BRIEF DESCRIPTION OF THE DRAWINGS

FIG. 7(c) is a diagram for explanation of the cylindrical lens; and .

DETAILED DESCRIPTION OF PREFERRED EMBODIMENTS

The present invention will be described with reference to the drawings.

Figure 1A:
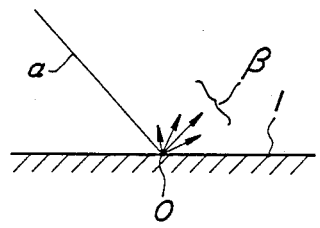
FIGS. 1(a) through 1(c) are diagrams for explanation of the principle of reflection.
Figure 1B:
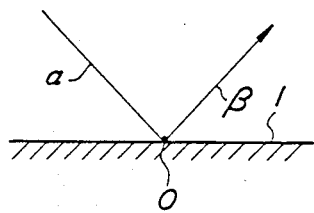
Figure 1C:
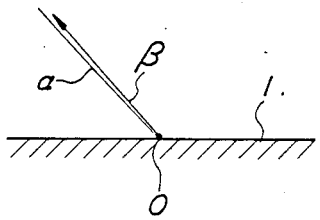

FIG. 1 is the diagram for explanation of the principle of reflection in which FIG. 1(a) illustrates the scattering reflection of an ordinary body, such as paper or cloth, FIG. 1(b) illustrates the specular reflection of a mirror, metal or glossy surface, and FIG. 1(c) illustrates the retroreflection. The symbol 1 indicates a reflecting body, the symbol $\alpha$ indicates the incident light, the arrow $\beta$ indicates the direction of the reflected light, and the length from the reflecting point indicated by the symbol 0 to the end of the arrow $\beta$ represents the strength of reflection. The reflection of an ordinary structure is as shown in FIGS. 1(a) and 1(b), thus, if a mark made of a member causing the retroreflection shown in FIG. 1(c) is used, the mark can easily be discriminated from an ordinary structure on the basis of the remarkable differences in amount and directivity of reflected light between the two.

Figure 2A:
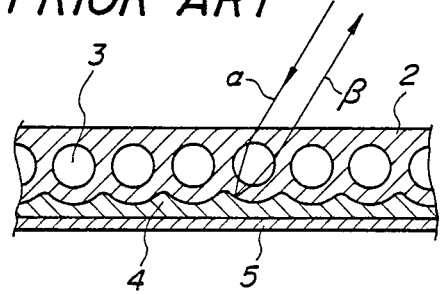
FIG. 2(a) is a sectional view of a retroreflecting member employable in a blind guide device according to the present invention.

The mark to be used in the blind guide device is desirable if it is inexpensive and easily installable. FIG. 2(a) is the sectional view of the member marketed by the trade name "SCOTCHLITE" from 3M Co. which exhibits the retroreflection property usable in the present invention. This member has a sheet-like or tape-like form, is used as the traffic marks and the like, and can easily be pasted to the structure. Glass beads 3 of a large refractive index are embedded in a transparent resin layer 2, thus, the incident light $\alpha$ is refracted by the glass beads 3, reflected by a reflecting film 4, again refracted by the glass beads 3, and becomes a reflected light $\beta$ being parallel to the incident light $\alpha$. The symbol 5 indicates a binding agent layer. This reflected light $\beta$ is stronger than 100 times the above reflected light $\beta$ obtained by a white paper, shown in FIG. 1(a) and exhibiting the scattering reflection, and has the retroreflection property, in a wide range of incident angle, up to about 60 degrees.

Figure 2B:
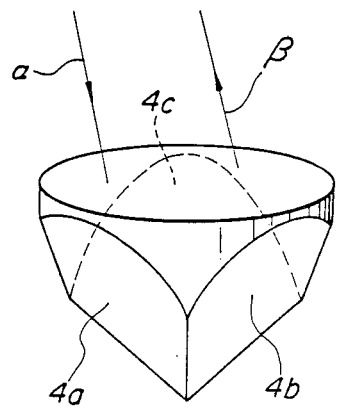
FIGS. 2(b) through 2(d) are diagrams for explanation of another retroreflecting member.
Figure 2C:
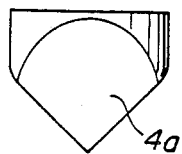
Figure 2E:
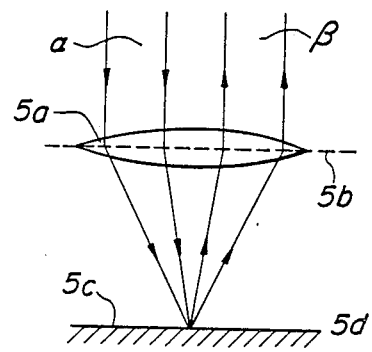
FIGS. 2(e) and 2(f) are diagrams for explanation of a further retroreflecting member.
Figure 2D:
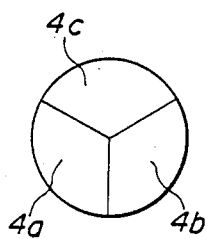

As such members of exhibiting retroreflection, a corner-cube reflector shown in FIGS. 2(b) through 2(d) is known. This reflector is composed of three plane reflecting mirrors 4a, 4b and 4c and assembled so that adjacent reflecting mirrors are mutually orthogonal and each reflecting mirror is facing the inside. Accordingly, the light α incoming against the reflecting surface is always projected, by means of the three reflecting surfaces 4a through 4c, in the form of the reflected light β being parallel to the incident light, but opposite in direction. On the basis of the same principle as that of this corner-cube reflector, it is possible to compose a corner-cube prism by glass or transparent resin. The traffic mark or rear reflecting mirror of the bicycle, used at night, is of the type in that a number of such corner-cube prisms are mutually assembled with respective reflecting surfaces arranged planely and in the same direction.

Figure 2F:
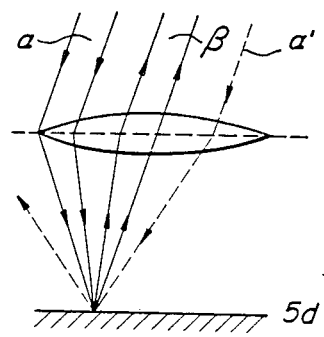

As another retroreflecting member, a member called "cat's eye" and shown in FIGS. 2(e) and 2(f) is known. This member is composed of a convex lens 5a and a reflecting mirror 5c positioned on one focal surface 5d of the former. The incoming light α is changed in its direction by the lens 5a, converged onto the reflecting mirror 5c and reflected thereat. Again, its direction is changed by the lens 5a, thus, the incoming light is projected in the form of the light β which is parallel to the incident light, but opposite in direction. While the light α incoming perpendicularly to the principal plane 5b of the lens 5a is wholly projected by the lens 5a, the other incoming non-perpendicularly is projected partially by the lens 5a. The ratio of the reflected light to the incident light becomes small as the angle of incidence increases.

Now, an exemplary manner of attaching of the sheet or tape shown in FIG. 2(a), one of these retroreflecting members, will be described with reference to FIG. 3.

Figure 3:
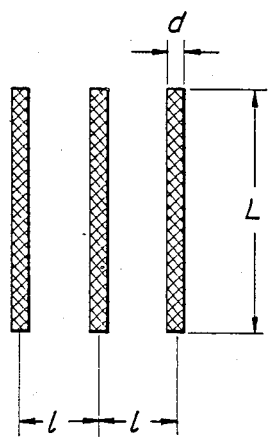
FIG. 3 is a diagram for explanation of a manner of installing the member shown in FIG. 2(a)

As shown in FIG. 3, a tape 6 having a width d (about three centimeters) and a length L (about one meter) is pasted to a wall or pole representing a specified place or location with its longitudinal direction arranged vertically. Though one tape 6 is generally sufficient, by the use of plural tapes it is possible to give them a meaning representing the pasted place or location. For example, it may be defined that the two tapes indicate a toilet room for man, the three tapes indicate a toilet room for woman, and the five tapes indicate an emergency exit. In such a case, each spacing l between tapes 6a, 6b, 6c is preferably about 15 centimeters.

Then, a device for detecting the mark in the form of the tape 6 will be described.

Figure 4:
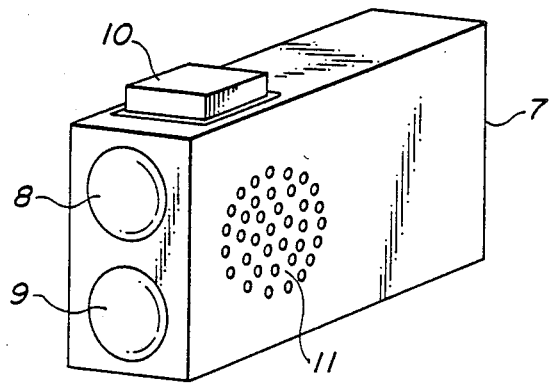
FIG. 4 is an external view of a blind guide device according to the present invention.

FIG. 4 is the external view of the present guide device. In the front of a casing 7 there are provided a lens 8 which projects the light emitted by a light-emitting element 17 (see FIG. 5) included in the casing, frontward in the form of a beam, and a lens 9 which introduces the reflected light into a photodetector element, i.e., a light-receiving element 20 (see FIG. 5) included in the casing. The symbol 10 indicates a power source switch and the symbol 11 indicates an electro-acoustic transducer, such as loudspeaker or earphone.

Figure 5A:
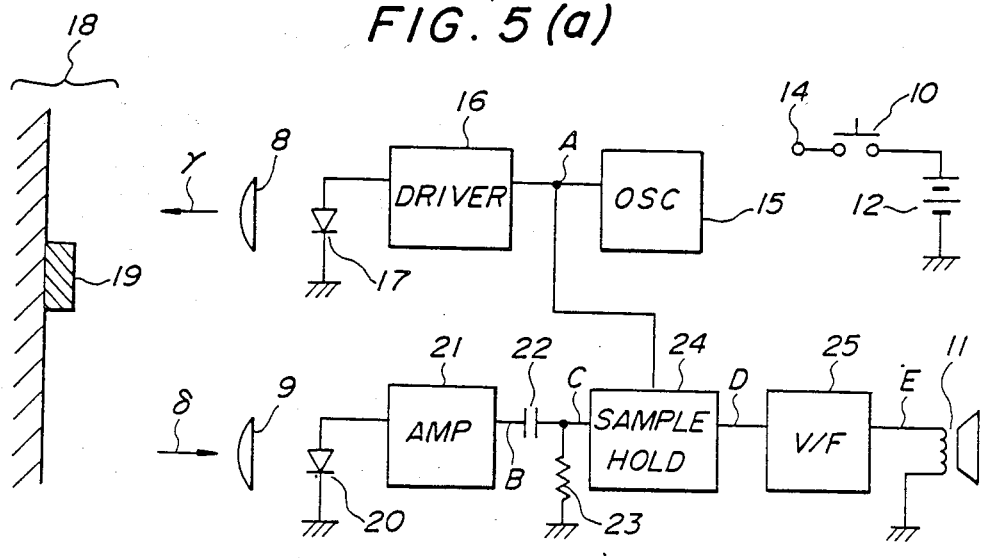
FIG. 5(a) is a block diagram of an electric circuit of the present guide device.
Figure 5B:
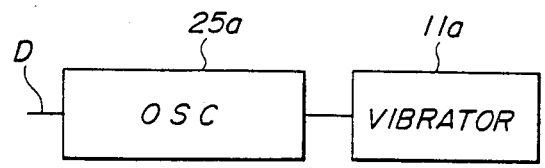
FIG. 5(b) is a partial block diagram of another electric circuit.

FIG. 5(a) is the block diagram of an electric circuit of the present guide device. The symbol 12 indicates a dry cell serving as a power source, and the symbol 10 indicates the power source switch.

Figure 6:
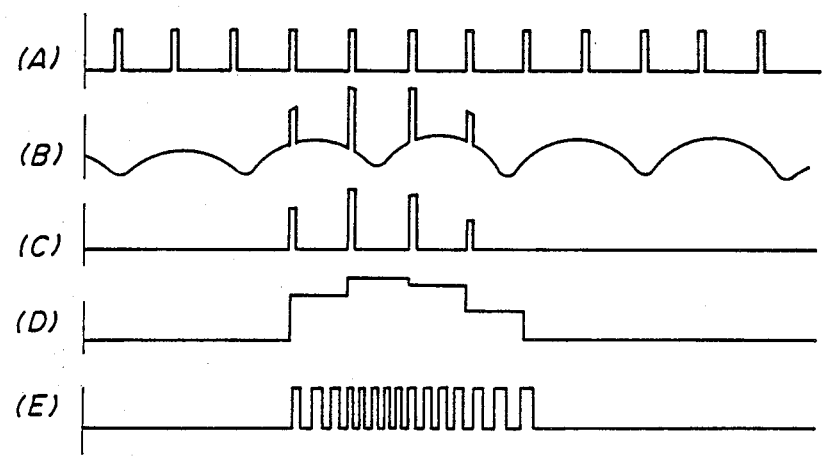
FIG. 6 is a time chart of electric signals at respective points in the electric circuit shown in FIG. 5.
Figure 7A:
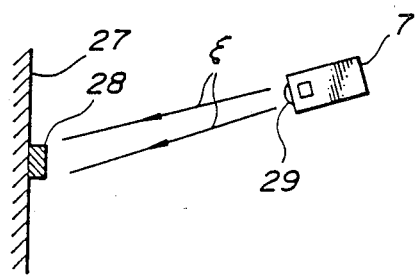
FIGS. 7(a) and 7(b) are diagrams showing optical paths of incidence light in a cylindrical lens employable in the present guide device.
Figure 7B:
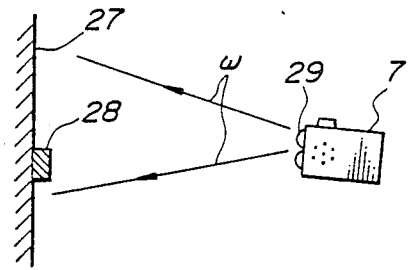
Figure 7C:
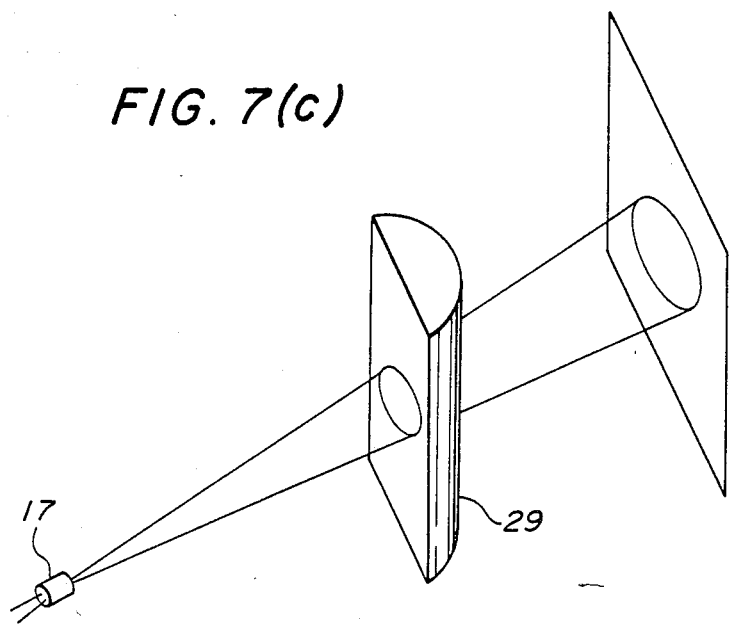
Figure 7D:
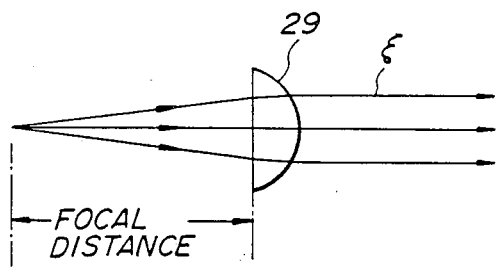
FIGS. 7(d) and 7(e) are a horizontal sectional view and a vertical sectional view, respectively, of the lens shown in FIG. 7(c).
Figure 7E:
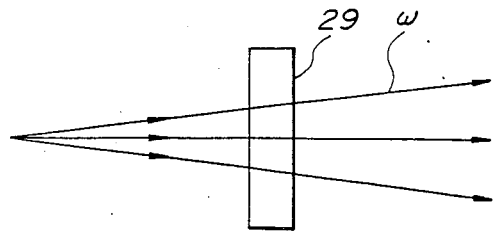

The symbol 14 indicates a terminal to supply a power to respective circuit blocks indicated by symbols 15, 16, 21, 24 and 25. The output waveform indicated by the symbol A of an oscillator circuit 15 is shown in FIG. 6(A), whose repetition frequency is about 100 Hz and the pulse width is about 10 μsec. This pulse wave is applied to a driver circuit 16 whereby it supplies a pulse current to the light-emitting element 17 such as light-emitting diode. If the peak current value is taken to be one ampere, the average consumption current becomes about one milliampere. The light emitted by the light-emitting element 17 is changed into a parallel light by the lens 8, the parallel light irradiates a body 18 to be detected, and the reflected light is converged onto the light-receiving element 20, such as photo diode. The arrows ε and δ indicate the directions of the projecting light and reflected light, respectively.

The light-receiving element 20 generates a current whose value is proportional to the strength of the incident light, which is amplified by an amplifier circuit 21 and converted into a voltage signal. In this moment, because the light-receiving element 20 receives further an external scattered light caused by the sun or illuminator, the output signal waveform (at point B) of the amplifier circuit 21 becomes as shown in FIG. 6(B). This signal is applied to a high-pass filter circuit composed of a condenser 22 and a resistor 23, whereby an influence resulting from the foregoing external scattered light is eliminated. The signal waveform at point C is shown in FIG. 6(C). Since the peak value of this pulse signal is proportional to the strength of the reflected light, it becomes large because a strong light is reflected and comes back when the projecting light is applied to a mark 19 having the retroreflection property. The signal (at point C) from the high-pass filter is applied to a sample-hold circuit 24 where it is sampled in synchronous with the output signal (at point A) of the oscillator circuit 15.

The output signal (at point D) of the samplehold circuit 24 is shown in FIG. 6(D). This signal is applied to a V/F (voltage/frequency) converter circuit 25 which oscillates at an audible frequency proportional to the applied voltage. This V/F converter circuit 25 may be formed of an oscillator whose amplitude is proportional to an input voltage. The output signal (at point E) of the V/F converter circuit 25 is applied to the electro-acoustic transducer 11 and output in the form of sound. The signal waveform at point E is shown in FIG. 6(E). The stronger the reflected light, the higher in frequency the sound becomes. In case an oscillator 25a (see FIG. 5(b)) whose amplitude is proportional to an input voltage is employed in place of the V/F converter circuit 25, the stronger the reflected light, the larger the sound becomes. The transducer 11 may be replaced by a vibrator 11a causing a low frequency vibration. In this case, the stimulation in the form of vibration, in place of sound, perceivable by touching the vibrator 11a by the use of the finger becomes a means of conveying the information to the blind.

As will be understood from the foregoing description, under the state where the retroreflecting tapes serving as the mark are pasted to an appropriate wall or pole with their longitudinal direction arranged vertically, by scanning horizontally the body to be detected by the use of the beam light projected from the present guide device carried by the blind, a sound of high frequency or large volume is generated from the loudspeaker when the beam light irradiates the mark, whereby this mark can be recognized by the blind. Therefore, the present guide device has the effects that by concentrating the light into a narrow beam a remote mark can be detected, and by scanning a bar code shown in FIG. 3 to read out the same it is possible to know what an object body is. Further, by pasting the mark to a floor, wall, ceiling, etc. in place of braille block or handrail, it is possible to guide and conduct the blind.

As the mark to be carried by the blind, a pendant, for example, is suitable which is made of the retroreflecting member. For instance, such a portable member may preferably be hung on a knob of a door for one's room when the blind stays at a hotel and the like. In this case, because the pendant is small, it is necessary to perform scanning in two directions, horizontally and vertically, by means of the foregoing beam light, and it would be difficult to detect such a small pendant. A means of overcoming such drawbacks will be described with reference to FIG. 7.

In FIG. 7, the same symbols as those of the other drawings illustrate the same members. FIGS. 7(a) and 7(b) are views as looked from the above and the side, respectively. The irradiating light, $\epsilon$, is concentrated, as shown by $\epsilon$ in FIG. 7(a), only in the horizontal direction as shown in FIG. 7(d) by a cylindrical lens 29 (see FIG. 7(c)), into the parallel light, whereas the same is concentrated not in the vertical direction, as shown by $\omega$ in FIG. 7(b) and left as a diffusing light as shown in FIG. 7(e).

Accordingly, detection of the pendant 28 hung on the wall 27 can easily be performed only through horizontal scanning manipulation of the present guide device.

Thus, there is provided in accordance with the present invention the blind guide device which has the advantage discussed above. The embodiments described are intended to be merely exemplary and those skilled in the art will be able to make variations and modifications in them without departing from the spirit and scope of the present invention. All such modifications and variations are contemplated as falling within the scope of the claims.

What is claimed is:

1. A blind guide device comprising
   a light-emitting element,
   a first electric circuit for generating an electric pulse and causing pulsating-conduction of said light-emitting element,
   a first lens for converging the light emitted from said light-emitting element onto a body to be detected,
   a mark attached to said body to be detected for performing retroreflection action,
   a second lens and a photo-detector element for receiving the light reflected by said body to be detected and said mark,
   a second electric circuit for amplifying the output electric signal of said photo-detector element and holding an electric signal synchronized with said electric pulse,
   a V/F converter circuit for generating an electric signal of audible frequency whose frequency varies in response to the output electric signal of said second electric circuit, and
   an electro-acoustic transducer for converting the output electric signal of said converter circuit into a sound.

2. A blind guide device as set forth in claim 1, wherein said mark for performing retroreflection action is composed of plural strips.

3. A blind guide device as set forth in claim 1, wherein said first lens is of a cylindrical shape.

4. A blind guide device comprising
   a light-emitting element,
   a first electric circuit for generating an electric pulse and causing pulsating-conduction of said light-emitting element,
   a first lens for converging the light emitted from said light-emitting element onto a body to be detected,
   a mark attached to said body to be detected for performing retroreflection action,
   a second lens and a photo-detector element for receiving the light reflected by said body to be detected and said mark,
   a second electric circuit for amplifying the output electric signal of said photo-detector element and holding an electric signal synchronized with said electric pulse,
   an oscillator circuit for generating an electric signal of audible frequency whose amplitude varies in response to the output electric signal of said second electric circuit, and
   an electro-acoustic transducer or vibrator for converting the output electric signal of said oscillator circuit into a sound or into a stimulation.

5. A blind guide device as set forth in claim 4, wherein said mark for performing retroreflection action is composed of plural strips.

6. A blind guide device as set forth in claim 4, wherein said first lens is of a cylindrical shape.

* * * * *